(12) United States Patent
Peitz et al.

(10) Patent No.: US 11,106,346 B2
(45) Date of Patent: Aug. 31, 2021

(54) WIRELESS DEVICE BATTERY OPTIMIZATION TOOL FOR CONSUMERS

(71) Applicant: Carrier Corporation, Palm Beach Gardens, FL (US)

(72) Inventors: Robert W. Peitz, Fishers, IN (US); Jing Li, Avon, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/638,581

(22) PCT Filed: Aug. 20, 2018

(86) PCT No.: PCT/US2018/047027
§ 371 (c)(1),
(2) Date: Feb. 12, 2020

(87) PCT Pub. No.: WO2019/036697
PCT Pub. Date: Feb. 21, 2019

(65) Prior Publication Data
US 2020/0218438 A1    Jul. 9, 2020

Related U.S. Application Data

(60) Provisional application No. 62/547,601, filed on Aug. 18, 2017.

(51) Int. Cl.
*G06F 3/0484* (2013.01)
*G06F 1/3234* (2019.01)
*H04L 12/24* (2006.01)

(52) U.S. Cl.
CPC ........ *G06F 3/04847* (2013.01); *G06F 1/3234* (2013.01); *H04L 41/22* (2013.01)

(58) Field of Classification Search
CPC ..... G06F 3/04847; G06F 1/3234; H04L 41/22
See application file for complete search history.

(56) References Cited

U.S. PATENT DOCUMENTS

| | | |
|---|---|---|
| 7,080,324 B1 | 7/2006 | Nelson et al. |
| D554,140 S | 10/2007 | Armendariz |
| 7,363,519 B2 | 4/2008 | Liebenow |

(Continued)

OTHER PUBLICATIONS

Written Opinion of the International Searching Authority for International Application No. PCT/US2018/047027; dated Nov. 2, 2018; dated Nov. 13, 2018; 13 pages.

(Continued)

*Primary Examiner* — Andrey Belousov
(74) *Attorney, Agent, or Firm* — Cantor Colburn LLP (57) ABSTRACT

A battery optimization method for sensors in communication with a first device is provided. The battery optimization method includes receiving, by a graphic user interface of the first device, an input on the graphic user interface. The input is an operation of a graphic element of the graphic user interface. The battery optimization method includes associating, by the first device, the input with a configuration parameter. The configuration parameter is assigned to each the sensors. The battery optimization method includes adjusting, by the first device, the configuration parameter to generate an adjusted parameter. The battery optimization method includes transmitting, by the first device, the adjusted parameter to the sensors.

8 Claims, 4 Drawing Sheets

(56) References Cited

U.S. PATENT DOCUMENTS

| | | |
|---|---|---|
| 7,389,439 B2 | 6/2008 | Yoon et al. |
| 8,091,796 B2 | 1/2012 | Amundson et al. |
| 8,346,397 B2 | 1/2013 | Harrod et al. |
| 8,593,427 B1 | 11/2013 | Yang et al. |
| 8,725,303 B2 | 5/2014 | Park et al. |
| 8,732,487 B2 | 5/2014 | Goraczko et al. |
| 9,026,778 B2 | 5/2015 | Andou |
| 9,201,565 B2 | 12/2015 | Isensee et al. |
| 9,218,037 B2 | 12/2015 | Jeansonne et al. |
| 9,361,008 B2 | 6/2016 | Kling et al. |
| 9,476,606 B2 | 10/2016 | Fadell et al. |
| 9,594,418 B2 | 3/2017 | Andou |
| 2004/0113890 A1 | 6/2004 | Ranta |
| 2005/0060659 A1* | 3/2005 | Verdun ............... G06F 3/04847 715/772 |
| 2005/0262451 A1 | 11/2005 | Remignanti |
| 2005/0270015 A1 | 12/2005 | Winick |
| 2005/0270151 A1 | 12/2005 | Winick |
| 2009/0140062 A1 | 6/2009 | Amundson et al. |
| 2010/0010857 A1 | 1/2010 | Fadell |
| 2011/0283235 A1 | 11/2011 | Kling et al. |
| 2013/0022274 A1 | 1/2013 | Lawrence et al. |
| 2014/0089709 A1 | 3/2014 | Furuya et al. |
| 2014/0095914 A1 | 4/2014 | Andou |
| 2015/0040017 A1 | 2/2015 | Roche et al. |
| 2015/0319006 A1* | 11/2015 | Plummer ............ H04L 12/2809 700/83 |

OTHER PUBLICATIONS

Notification of Transmittal of the Search Report for International Application No. PCT/US2018/047027; dated Nov. 2, 2018; dated Nov. 13, 2018; 6 pages.

\* cited by examiner

WIRELESS DEVICE BATTERY OPTIMIZATION TOOL FOR CONSUMERS

CROSS-REFERENCE TO RELATED APPLICATIONS

This application is a National Stage Application of International Application No. PCT/US2018/047027 filed Aug. 20, 2018, which claims the benefit of U.S. Provisional Application No. 62/547,601 filed Aug. 18, 2017, the disclosures of which are incorporated herein by reference in their entirety.

BACKGROUND

There are numerous configuration parameters that affect comfort and battery life in contemporary control heating, ventilation, and air conditioning systems utilizing wireless sensors as part of the control strategy. If a consumer wishes to make trade-offs between comfort and battery life, it is presently very difficult for the consumer to understand an impact of each of the system configuration parameters to make a decision on which parameters to adjust, let alone a possible effect of an adjustment of those configuration parameters.

BRIEF DESCRIPTION

In accordance with one or more embodiments, a battery optimization method for one or more sensors in communication with a first device is provided. The battery optimization method comprises receiving, by the first device comprising a graphic user interface, an input on the graphic user interface, wherein the input is an operation of a graphic element of the graphic user interface; associating, by the first device, the input with at least one configuration parameter, wherein the at least one configuration parameter is assigned to each of the one or more sensors; adjusting, by the first device, the at least one configuration parameter to generate at least one adjusted parameter; and transmitting, by the first device, the at least one adjusted parameter to the one or more sensors.

In accordance with one or more embodiments or the battery optimization method embodiment above, the graphic element can comprise a slider on a track.

In accordance with one or more embodiments or any of the battery optimization method embodiments above, the graphic element can be configured to move between a first endpoint and a second endpoint.

In accordance with one or more embodiments or any of the battery optimization method embodiments above, the first endpoint can comprise a comfort endpoint and the second endpoint can comprise a battery life endpoint.

In accordance with one or more embodiments or any of the battery optimization method embodiments above, the operation of the graphic element can be an automatic adjustment of a final position in accordance with a mode setting.

In accordance with one or more embodiments or any of the battery optimization method embodiments above, the operation of the graphic element can apply to the at least one configuration parameter to the at least one adjusted parameter all of the one or more sensors even if ranges or units of the adjusted parameters are different for each of the one or more sensors.

In accordance with one or more embodiments, a battery optimization system is provided. The battery optimization system comprises a first device comprising a graphic user interface, a processor, and a memory storing processor executable instructions thereon; one or more sensors in communication with the first device, the processor executable instructions when executed by the processor of the first device cause the battery optimization system to: receive an input on the graphic user interface, wherein the input is an operation of a graphic element of the graphic user interface; associate the input with at least one configuration parameter, wherein the at least one configuration parameter is assigned to each of the one or more sensors; adjust at least one configuration parameter to generate at least one adjusted parameter; and transmit the at least one adjusted parameter to the one or more sensors.

In accordance with one or more embodiments or any of the battery optimization system embodiments above, the graphic element can comprise a slider on a track.

In accordance with one or more embodiments or any of the battery optimization system embodiments above, the graphic element can be configured to move between a first endpoint and a second endpoint.

In accordance with one or more embodiments or any of the battery optimization system embodiments above, the first endpoint can comprise a comfort endpoint and the second endpoint can comprise a battery life endpoint.

In accordance with one or more embodiments or any of the battery optimization method embodiments above, the operation of the graphic element can be an automatic adjustment of a final position in accordance with a mode setting.

In accordance with one or more embodiments or any of the battery optimization system embodiments above, the operation of the graphic element can apply to the at least one configuration parameter to the at least one adjusted parameter all of the one or more sensors even if ranges or units of the adjusted parameters are different for each of the one or more sensors.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments disclosed herein may include a battery optimization system, method, and/or computer program product (herein collectively referred to as the battery optimization system) that provides a wireless device battery optimization tool for consumers to determine between comfort and battery life (e.g., home comfort).

Figure 1:
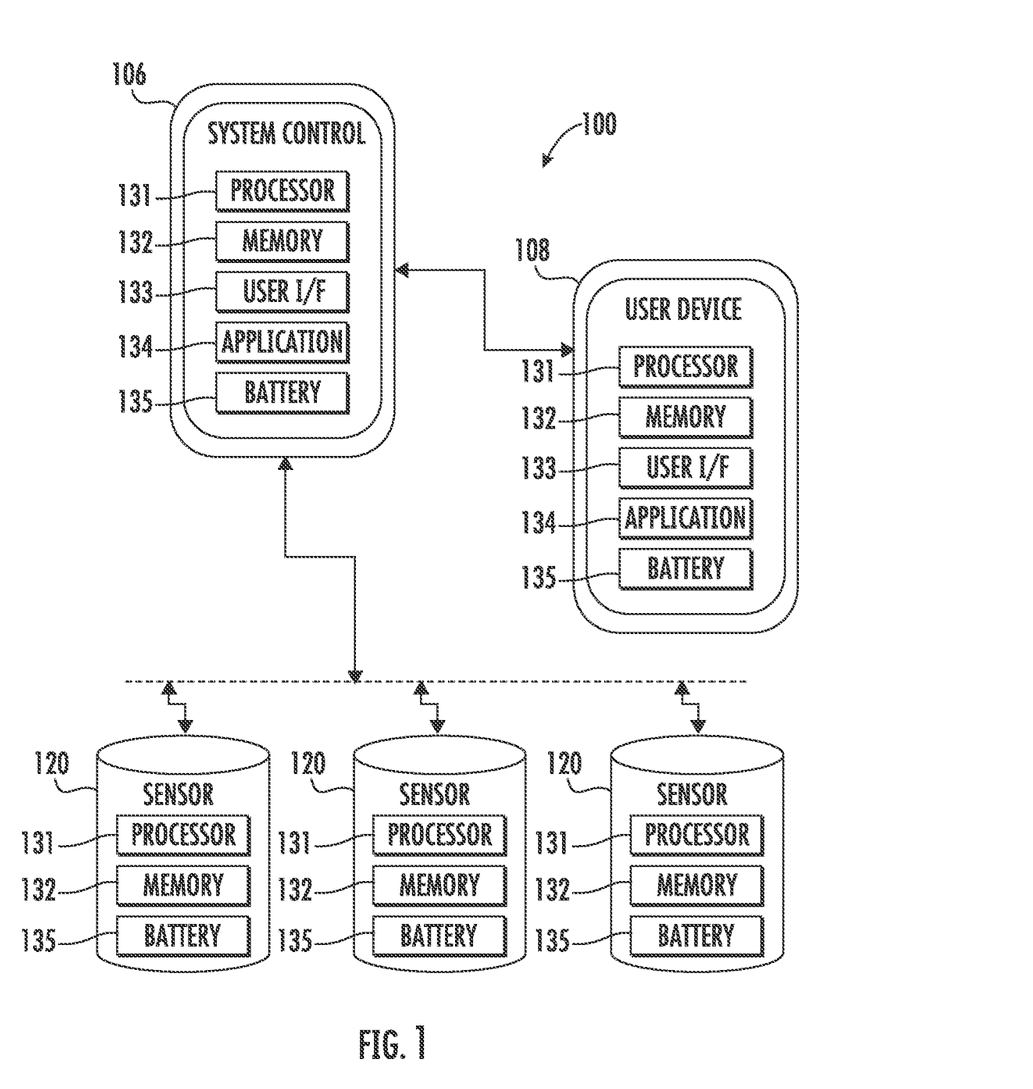
FIG. 1 depicts a battery optimization system in accordance with one or more embodiments.

Turning now to FIG. 1, a battery optimization system 100 is depicted in accordance with one or more embodiments. The battery optimization system 100 can comprise a system control 106, a user device 108, and one or more sensors 120, each of which is in communication (as shown by the dashed line and dashed arrows) and each of which can comprise one or more of a processor 131, a memory 132, a user interface (I/F) 133, an application 134, and a battery 135.

The battery optimization system 100 can be referred to as a comfort system designed for home or commercial use. The communication can be supported by wired and/or wireless connections within a network supporting the components of the battery optimization system 100. In accordance with one or more embodiments, the battery optimization system 100 can be a wireless system with all components operating on battery power.

The system control 106 and the user device 108 can be any computing device comprising hardware and/or software for carrying out operations of the battery optimization system 100. The system control 106 may also be referred to as a wall control. Examples of the system control 106 include thermostats, control panels, and the like that provide control for the one or more sensors 120 and other units, whether individually or simultaneously. Examples of the user device 108 include smartphones, personal digital assistants, laptops, and tablet computers. The system control 106 and the user device 108 can optimize convenience with a touch screen.

The one or more sensors 120 can be electro-mechanical or electronic components that detect events or changes in an environment of a facility within which the battery optimization system 100 (or corresponding components therein) is installed. The sensors 136 output the events or changes as sensor signals to other components of the battery optimization system 100 (e.g., the system control 106 and the user device 108). Examples of the one or more sensor 120 include thermostats, thermometers, humidistat, hygrometer, barometers, liquid level switches and sensors, pressure sensors, and the like.

The one or more sensors 120 can operate in accordance with configuration parameters. The configuration parameters are adjustable. Examples of the configuration parameters includes health report interval (which may be bi-directionally communicated); local sampling interval; temperature change threshold; humidity change threshold; auxiliary input sampling interval; and radio frequency output power. Note that changes greater than an amount set for the temperature change threshold and the humidity change threshold can cause a communication from the wireless sensor. Each of these configuration parameters can be set within a range, and the configuration parameters may be different in each of the one or more sensors 120 associated with the battery optimization system 100. For example, the health report interval can be set on a range of 15-240 minutes (e.g., 30 minutes); the local sampling interval can be set on a range of 5-120 seconds (e.g., 30 seconds); the temperature change threshold can be set on a range of 0-0.5 degrees Fahrenheit (e.g., 0.5 degrees Fahrenheit); the humidity change threshold can be set on a range of 0-10% relative humidity (e.g., 5% relative humidity); the auxiliary input sampling interval can be set on a range of 5-120 seconds (e.g., 30 seconds); and the radio frequency output power can be set on a range of 0-5 dBm (e.g., 5 decibels). Note that the defaults for these configuration parameters can be set at a factory (e.g., original equipment manufacturer) and adjusted in the field by an installer. Anything that the installer can change, the factory can change as well (e.g., since a range of changes that can be made by the factory could be broader than what the installer is allowed to change; for example, the health report interval). In accordance with one or more embodiments, a slider of an interface on the system control 106 or the user device 108 can be utilized by a user to adjust any configuration parameters that the installer can change.

The processor 131 (also referred to as a processing circuit) can be coupled via a system bus to the memory 132, respectively, and various other components. The memory 132 can include a variety of memory types, including but not limited to, a read only memory (ROM) and a random access memory (RAM). The ROM is coupled to the system bus and may include a basic input/output system (BIOS), which controls certain basic functions of the processor 131 or the battery optimization system 100. The RAM is read-write memory coupled to the system bus for use by the processor 131.

Software for execution by the battery optimization system 100 may be stored in the memory 132. For example, the memory 132 can store the application 134 or other computer program product. The memory 132 is an example of a tangible storage medium readable by the processor 131, where the software is stored as instructions for execution by the processor 131 to cause the battery optimization system 100 to operate, such as is described herein with reference to FIG. 2. Examples of computer program product and the execution of such instruction is discussed herein in more detail.

The user I/F 133 can be any type of user interface that allows users to interact with the system control 106 and the user device 108 through graphical icons and visual indicators, text-based user interfaces, typed command labels, or text navigation. In accordance with one or more embodiments, the user I/F 133 can be graphic user interfaces supported by the application 134 and providing a slider for user interaction.

The application 134 can be software for execution by he processor 131 or the battery optimization system 100. In accordance with one or more embodiments, the application 134 can be a wireless device battery optimization tool for providing a slider control that enables a consumer to make a relative adjustment between increasing a battery life of a wireless sensor and increasing a level of comfort for a heating, ventilation, and air conditioning system. For example, the wireless device battery optimization tool can provide a slider control that enables a consumer to make a relative adjustment between increasing a battery life of a wireless sensor (or all wireless sensors, e.g., when moving the slider control, the battery life of all wireless sensors installed in the conditioned space are affected) and increasing a comfort for a heating, ventilation, and air conditioning system. Note that the wireless device battery optimization tool is designed with scalability and versatility.

The battery 135 can be a device consisting of one or more electrochemical cells with external connections provided to power electrical devices such as the system control 106, the one or more sensors 120, etc.

Figure 2:
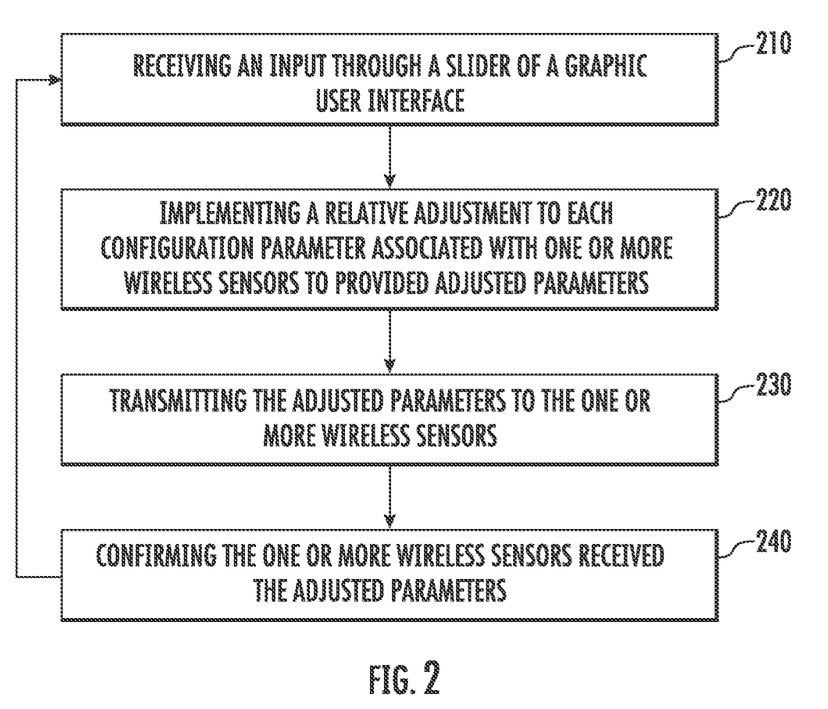
FIG. 2 depicts a process flow of a battery optimization system in accordance with one or more embodiments.

FIG. 2 depicts a process flow 200 of a battery optimization system 100 in accordance with one or more embodiments. The process flow 200 can be executed by the system control 106. The process flow can begin at block 210, where the wall control 106 receives an input through a graphical element (e.g., items 332 and 333 shown in FIG. 3) from the graphic user interface 133, wherein the input is indicative of a user's preference with respect to optimizing battery life and increasing satisfaction with a user defined parameter. In an embodiment, the graphic element 333 includes a slider. In accordance with one or more embodiments, the input may be received on the user device 108 and transmitted to the system control 106 via wired or wireless communications.

Figure 3:
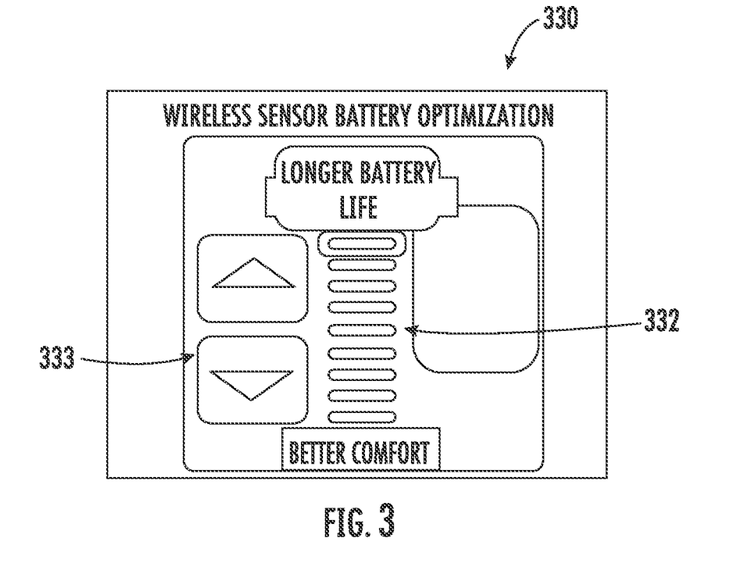
FIG. 3 depicts a graphic user interface flow of a battery optimization system in accordance with one or more embodiments.

The input correlates to a final position of the graphical element. FIG. 3, which is described further herein, illustrates graphic user interfaces that can be used to check whether the configuration parameters have been adjusted. The graphical element can be manipulated based on a direct user input (e.g., user guided sliding action) or automatic mode setting (e.g., an automatic adjustment of a final position of the slider in accordance with a particular operating mode). With respect to an automatic mode setting, the application 134 of the system control 106 can operate in a variety of modes, including but not limited to, a night mode, a day mode, a vacation mode, etc. Based on the current operating mode, the system control 106 may automatically adjust the graphical element to a specific position based at least in part on the associated changes to the configuration parameters. In accordance with an embodiment, individual sliders can be assigned to individual wireless sensors, groups wireless sensors, etc.

At block 220, the system control 106 operates to adjust at least one configuration parameter associated with one or more sensors 120 to provided adjusted parameters. For example, the first device associates the input with at least one configuration parameter. The at least one configuration parameter can be assigned to each of the one or more sensors. In this way, one setting applies to all of the one or more sensors 120 in the battery optimization system 100, even if the ranges or units of the adjusted parameters are different.

At block 230, the system control 106 transmits the adjusted parameters to the one or more sensor 120. Thus, the adjusted parameters can be applied globally to all of the one or more sensors 120 in the battery optimization system 100.

Figure 4:
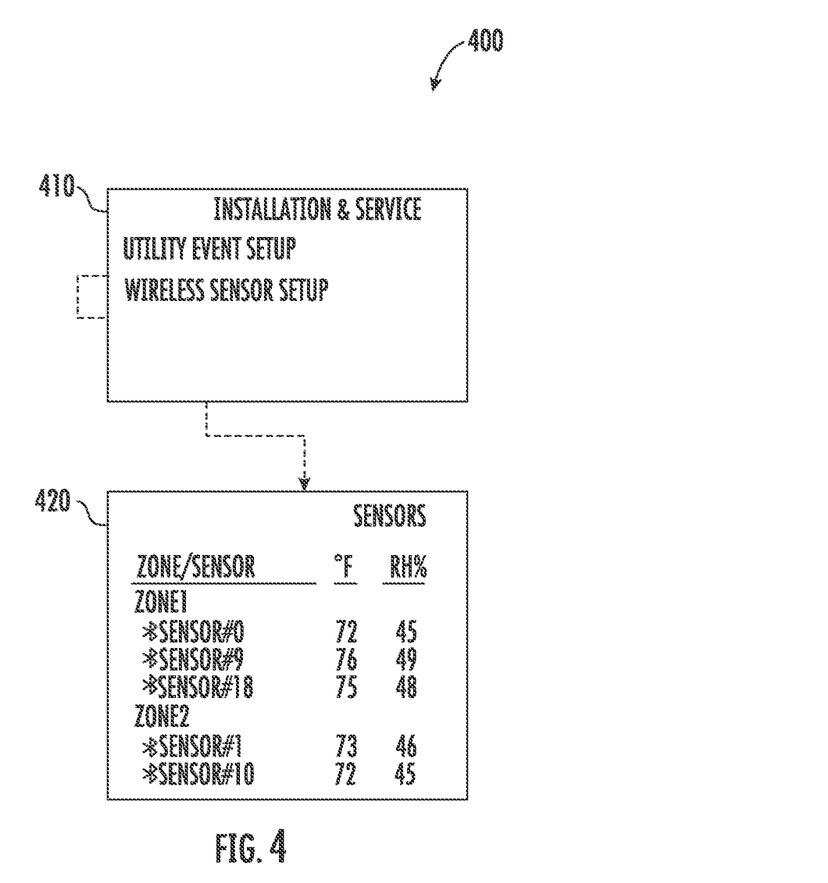
FIG. 4 depicts a graphic user interface flow of a battery optimization system in accordance with one or more embodiments.

At block 240, the system control 106 confirms that the one or more sensors 120 received the adjusted parameters. This check can be performed by a user operating the system control 106 (e.g. to check that the one or more sensors 120 are operating under new adjusted parameters). FIG. 4, which is described further herein, illustrates graphic user interfaces that can be used to check whether the configuration parameters have been adjusted.

FIG. 3 depicts an interface 330 of a battery optimization system 100 in accordance with one or more embodiments. The interface 330 provides a graphic element 332 (i.e., slider) and arrow interfaces 333. The graphic element 332 is a graphical indicator of battery optimization configured to range between a "better comfort" endpoint and a "longer battery life" endpoint. For example, a consumer selects whether they want to have longer battery life by engages the up arrow interface such that the graphical indicator moves towards the "longer battery life" endpoint. Conversely, when a consumer selects to have better comfort, the user engages the down arrow interface such that the graphical indicator moves towards the "better comfort" endpoint. It will be appreciated that graphic elements other than a slider may be used, such as a dial to name one non-limiting example, to achieve the same operation. In accordance with one or more embodiments, the operation of the slider can be a movement along a circular track in accordance with one or more radial positions of a dial interface.

FIG. 4 depicts a graphic user interface flow 400 of a battery optimization system in accordance with one or more embodiments. The graphic user interface flow 400 illustrates a transition between interfaces 410 and 420. The interface 410 provides a list of options, including a utility event setup option and a wireless sensor setup option. Upon selection of the wireless sensor setup option of the list of options, as shown by the dashed box, the interface 420 is provided. The interface 420 illustrates a plurality of sensors (e.g., sensor #0, sensor #9, and sensor #18 of zone1 and sensor #1 and sensor #10 of zone2), each of which is associated with the configuration parameters regarding the temperature change threshold and the humidity change threshold. Note that in response to the adjusted parameters being transmitted by the system control 106 to the one or more sensors 120, the configuration parameters can be set to a global incremental value (e.g., a global temperature, a global relative humidity, etc.). In accordance with one or more embodiments, a global incremental value can be set to a plurality of graphic element positions with a center position being a base setting. The base setting can be a default set by either the manufacturer or an installer. Further, a slider effect can be an amount that each position, + or −, can change the base setting (each tick of the slider can be a change amount to the global incremental value). In turn, once a slider is moved, the configuration parameters can change per position of the slider. Therefore, moving the slider can change all of the settings by the multiples of incremental values.

In view of the above, the consumer does not need to know the intricacies of all of the different configuration parameters of the wireless sensor that affect battery life and comfort, because a single motion of the slider makes relative adjustments to each of a number of configuration parameters, customizable by the factory or the installer, to increase either comfort or battery life. The technical effects and benefits herein include a simple, easy to understand, single adjustment mechanism to affect one or more of the configuration parameters that affect the battery life of the wireless sensor, or conversely, the ability of the heating, ventilation, and air conditioning system to provide comfort, based on measurements made by the wireless sensor Embodiments herein can include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A battery optimization method for one or more sensors in communication with a first device, the battery optimization method comprising:
   receiving, by the first device comprising a graphic user interface, an input on the graphic user interface,
   wherein the input is an operation of a graphic element of the graphic user interface;
   associating, by the first device, the input with at least one configuration parameter,
   wherein the at least one configuration parameter is assigned to each of the one or more sensors;
   adjusting, by the first device, the at least one configuration parameter to generate at least one adjusted parameter; and
   transmitting, by the first device, the at least one adjusted parameter to the one or more sensors;
   wherein the graphic element is configured to move between a first endpoint and a second endpoint;
   wherein the first endpoint comprises a level of comfort for a heating, ventilation and air conditioning system, and the second endpoint comprises a battery life of each of the one or more sensors.

2. The battery optimization method of claim 1, wherein the graphic element comprises a slider on a track.

3. The battery optimization method of claim 1, wherein the operation of the graphic element is an automatic adjustment of a final position in accordance with a mode setting.

4. The battery optimization method of claim 1, wherein the operation of the graphic element applies to the at least one configuration parameter to the at least one adjusted parameter all of the one or more sensors even if ranges or units of the adjusted parameters are different for each of the one or more sensors.

5. A battery optimization system comprising:
   a first device comprising a graphic user interface, a processor, and a memory storing processor executable instructions thereon;
   one or more sensors in communication with the first device,
   the processor executable instructions when executed by the processor of the first device cause the battery optimization system to:
   receive an input on the graphic user interface,
   wherein the input is an operation of a graphic element of the graphic user interface;
   associate the input with at least one configuration parameter,
   wherein the at least one configuration parameter is assigned to each of the one or more sensors;
   adjust at least one configuration parameter to generate at least one adjusted parameter; and
   transmit the at least one adjusted parameter to the one or more sensors;
   wherein the graphic element is configured to move between a first endpoint and a second endpoint;
   wherein the first endpoint comprises a level of comfort for a heating, ventilation and air conditioning system, and the second endpoint comprises a battery life of each of the one or more sensors.

6. The battery optimization system of claim 5, wherein the graphic element comprises a slider on a track.

7. The battery optimization system of claim 5, wherein the operation of the graphic element is an automatic adjustment of a final position in accordance with a mode setting.

8. The battery optimization system of claim 5, wherein the operation of the graphic element applies to the at least one configuration parameter to the at least one adjusted parameter all of the one or more sensors even if ranges or units of the adjusted parameters are different for each of the one or more sensors.

* * * * *